Patented Mar. 6, 1934

1,949,749

UNITED STATES PATENT OFFICE 1,949,749

TREATMENT OF HYDROCARBON OILS

Charles D. Lowry, Chicago, Ill., assignor to Universal Oil Products Company, Chicago, Ill., a corporation of South Dakota No Drawing. Application May 2, 1931, Serial No. 534,701

7 Claims. (Cl. 196—23)

This invention relates to the treatment of hydrocarbon oils and refers more particularly to the refining of petroleum distillates, especially cracked distillates, produced by the conversion of higher boiling hydrocarbons into more valuable lower boiling hydrocarbons.

Petroleum distillates, especially cracked distillates, containing undesirable compounds, presumably of a highly unsaturated nature, which are responsible for the formation of gum, color and odor in the motor fuel produced therefrom. It is among the objects of my invention to provide a process for refining petroleum distillates to produce motor fuels of improved color and odor and eliminate the objectionable gum-forming components of said distillates to meet present-day stringent specifications in regard to these characteristics.

In a specific embodiment, the invention relates to the treatment of hydrocarbon oils by contacting the same, preferably while in the vaporous state, with greensand, composed largely of the mineral glauconite.

In another embodiment of my invention, it comprises the treatment of hydrocarbon oils, preferably in vaporous form, by subjecting the same, together with hydrochloric acid or steam and hydrogen chloride, to contact with greensand.

Greensand is a granular, unconsolidated material, consisting largely of glauconite, and sometimes contains, in addition, from about 1 to 50% of quartz, calcite and clay, a typical analysis of which is as follows:—

| | | | |
|---|---|---|---|
| $SiO_2$ | 50.93 | $K_2O$ | 7.03 |
| $Fe_2O_3$ | 17.63 | $Na_2O$ | 0.83 |
| $FeO$ | 3.09 | $CO_2$ | 0.46 |
| $Al_2O_3$ | 5.23 | $P_2O_5$ | 0.81 |
| $CaO$ | 1.34 | $H_2O$ | 9.21 |
| $MgO$ | 3.74 | | |

The operation of the process of my invention may be effected by passing the hydrocarbons while in vaporous form through and in contact with the greensand, a body of which may be disposed within a tower or treating column. The tower containing the greensand and through which the vaporous hydrocarbons may pass for treatment, may be operated in conjunction with an oil cracking process, or a still wherein liquid hydrocarbons are vaporized, the vapors from said cracking process or still being delivered to said tower for passage therethrough in contact with the greensand, by any desired means. In passing through the treating tower in contact with the greensand, the objectionable constituents of the oil which form gums and undesirable odors, will polymerize therein, be withdrawn therefrom, and the desired vapors passed to a suitable cooler and condenser, after which the resultant distillate may be collected in a suitable receiver.

In one modification of the process, hydrochloric acid or steam and hydrogen chloride may be employed as treating agents in combination with the greensand. In the practice of this form of my invention, the hydrochloric acid may preferably be introduced into the vapors prior to their passage into the treating tower wherein it vaporizes and is converted into hydrogen chloride and steam; or, if desired, steam and hydrogen chloride may be introduced into the treating tower together with the hydrocarbon vapors undergoing treatment.

In general, any desired type of apparatus may be employed in the practice of my invention, such as the conventional towers employed in oil cracking processes wherein an efficient contacting and intermingling of the hydrocarbon vapors with the greensand, either alone or in combination with hydrochloric acid or hydrogen chloride and steam may be effected.

The amount of hydrochloric acid used may vary from approximately 1% to 10% by volume of the oil treated in concentrations of approximately from 1% to 37%.

As a specific example of operating conditions and results obtained by one application of my invention, a cracked distillate from a California charging stock, having a boiling point range of approximately 97° F. to 437° F. was distilled and the vapors passed through a treating column containing greensand. The temperatures of treatment varied from 350° F. to about 400° F. In one case, the vapors were passed downwardly through the column, withdrawn therefrom and condensed. On subsequent redistillation with steam, the distillate had a color of 30 and a gum content in various fractions of from 1 to 28 mgs. The color of the original distillate was deep yellow and the distillate had a gum content of 250 mgs. per 100 c. c. s. by the copper dish test. A composite 410° F. fraction from the treated oil had a color of plus thirty and less than 20 mgs. of gum per 100 c. c. s. Similar results were obtained by passing the vapors upwardly through the column, removing the polymers separately from the bottom of the column and taking 410° F. end point product overhead and condensing the same.

In an operation wherein a cracked distillate from a west Texas charging stock was treated with greensand by the methods described, a gasoline of 30 color, containing only 6 mgs. of gum per 100 c. c. s. was produced.

In another test, a California cracked distillate was distilled through a column, together with vapors of steam and hydrogen chloride produced by vaporizing hydrochloric acid in relatively dilute solutions,—approximately 2 to 8% solution,—the hydrocarbon vapors, steam and hydrogen chloride resulting therefrom being passed through the column and the overhead vapors removed and condensed together with unused hydrochloric acid. I have found that the use of hydrochloric acid prolongs considerably the length of treatment and the yield of refined distillate from the greensand. For example, in one test, approximately three times the yield of a 30 color distillate could be obtained by the use of the equivalent of 1 to 2 pounds of hydrochloric acid per barrel of oil as compared with greensand alone.

The following data shows some of the results obtained in regard to color and gum of the original oil and that treated with greensand and hydrochloric acid in accordance with the process of my invention:

| Origin of cracked distillate | Original | | Treated with greensand and hydrochloric acid | |
|---|---|---|---|---|
| | Color | Gum | Color | Gum |
| Pennsylvania | Yellow | 209 | 30 | 0 |
| West Texas | ---do--- | 480 | 30 | 6 |
| California | ---do--- | 250 | 30 | 13 |

It is to be understood, of course, that the above examples are merely illustrative and in no wise limitations upon the broad concepts of my invention, and that variations thereof may be adopted without departing from the spirit or scope of my process.

I claim as my invention:—

1. A process for the treatment of hydrocarbon oil which comprises subjecting said oil while substantially in vapor phase to the action of greensand.

2. A process for the treatment of hydrocarbon oil which comprises subjecting said oil to the action of greensand in the presence of hydrochloric acid.

3. A process for the treatment of hydrocarbon oil which comprises subjecting said oil to the action of greensand in the presence of steam and hydrogen chloride.

4. A process for the treatment of hydrocarbon oil, which comprises passing hydrocarbon vapors through a treating zone wherein a body of greensand is maintained.

5. A process for the treatment of hydrocarbon oil, which comprises passing hydrocarbon vapors from a cracking process through a treating zone wherein a body of greensand is maintained.

6. A process for the treatment of hydrocarbon oil which comprises contacting hydrocarbon vapors with greensand in the presence of hydrochloric acid.

7. A process for the treatment of hydrocarbon oil which comprises passing said oil while in its vaporous state through a contacting mass of greensand while in the presence of steam and hydrogen chloride.

CHARLES D. LOWRY.